3,097,921
PRODUCTION OF HYDROGEN CYANIDE
Douglas J. Kennedy, Shawinigan, Quebec, and Noel B. Shine, Shawinigan South, Quebec, Canada, assignors to Shawinigan Chemicals Limited, Quebec, Canada, a corporation of Canada
No Drawing. Filed Mar. 15, 1961, Ser. No. 95,795
4 Claims. (Cl. 23—151)

This invention relates to a process for the production of hydrogen cyanide from ammonia and gaseous hydrocarbons in a fluidized bed apparatus heated by the passage of electricity through the fluidized bed.

It is the principal object of this invention to provide a process for the production of hydrogen cyanide from ammonia and hydrocarbon gas in an electrically heated fluidized bed, in which the deposition of carbon in the reaction furnace is eliminated or minimized. This and other objects of the invention will be apparent from the following description.

A process for the production of hydrogen cyanide from ammonia and gaseous hydrocarbons in an electrically heated fluidized bed is described by Johnson and Andersen in U.S. Patent 2,958,584, issued November 1, 1960.

In carrying out the process of said patent on a commercial scale, it has been found that the deposition of carbon in the reaction furnace by unavoidable side reactions, can lead to short-circuits, to the blocking of gas outlet passages, and to uncontrollable diminution of the electrical resistance of the fluidized bed, thereby necessitating an interruption of the process in order to remove carbon deposits. Such interruptions in a process are costly. Furthermore, any carbon appearing as such represents a lowering of the yield of hydrogen cyanide from hydrocarbon gas.

It has now been found that the addition of hydrogen to the fluidized bed with the reactants, in an adequate ratio with respect to ammonia, can greatly reduce or eliminate the deposition of carbon. As hydrogen is one of the products of the reaction, the hydrogen for this addition can conveniently be hydrogen separated from the other products and recycled to the fluidized bed.

Thus, the invention consists, in a process for the production of hydrogen cyanide which comprises maintaining a bed of electrically conductive carbon particles in a fluidized state in a reaction furnace by passing upwardly through the said bed a stream of ingoing gas comprising a mixture of ammonia and a hydrocarbon gas, and passing an electric current through the said fluidized bed with sufficient power to maintain the bed at an elevated temperature of about 1300° to 1600° C. sufficient to maintain reaction to form hydrogen cyanide, in the improvement which comprises introducing hydrogen into the fluidized bed with the reactants in a volume ratio of hydrogen to ammonia of at least 0.25 to 1.

Soot formation and deposition of carbon in the reaction furnace can be a major problem affecting the efficient operation of an electrically heated fluidized bed process for the production of hydrogen cyanide. The source of such soot or carbon is unreacted carbon from the original hydrocarbon feed stock and/or carbon formed by decomposition of the desired product hydrogen cyanide. Soot formation thus represents a loss in yield of the desired product. The deposition of only a small proportion of such carbon in the reaction furnace can be a serious problem, because the deposited carbon is soon converted to a dense hard material which is extremely difficult to remove; removal may require, for example, the slow and expensive process of burning with oxygen.

Carbon deposits on the electrodes decrease the interelectrode spacing and thereby upset the electrical resistance relationships in the furnace. In the absence of sufficient hydrogen in the feed mixture, the furnace resistance tends to decrease gradually during the operation of the furnace; the trend to lower resistance in the furnace can become noticeable in as little as half an hour and possibly less. One possible reason for lowered resistance is the formation of soot particles in the fluid bed which have relatively high electrical conductivity and improve the electrical conductivity of the bed. The space between the electrodes and the furnace roof tends to accumulate a crusty mixture of coke and soot, and such carbon deposition in the reactor roof appears to be responsible for recurrent short-circuits, limiting continuous operation of the process to a few days. Carbon can also build up in layers in gas outlet passages, and develop into dense hard material, eventually blocking such outlets, thereby limiting the periods of continuous operation.

In the absence of sufficient hydrogen in the feed gas, there are several factors which tend to aggravate the amount of carbon deposited, including the following:

(a) The presence of olefinically unsaturated hydrocarbons in the gaseous hydrocarbons fed to the furnace.

(b) Ratios of ammonia to hydrocarbon which are too low, that is, in which there is slightly less than one nitrogen atom for each carbon atom fed to the furnace.

(c) Operating temperatures which are lower than the optimum, which is about 1450° C.

It is found that hydrogen dilution of the feed stock minimizes or eliminates the deposition of soot and other carbon, permitting a furnace to be operated continuously for several months without stopping the process to remove carbon deposits.

According to the present invention, gaseous hydrogen is fed to the reaction furnace at an optimum ratio of about 1.0 to 1.5 volumes of hydrogen for each volume of ammonia. The reaction furnace can operate efficiently with hydrogen to ammonia volume ratios as high as 4 to 1 and 5 to 1. Thus hydrogen can be used to modify and improve the fluidization of the bed without using the reactants ammonia or hydrocarbon gas to accomplish the modification. The main increase in operating costs for such modification is the cost of the sensible heat required to heat the additional hydrogen. Higher ratios can give greater benefit but they increase the cost of operation. Ratios lower than about 0.25 to 1 of hydrogen to ammonia are of so little benefit that they would not be commercially satisfactory for any extended period of operation, although it is felt that they are better than nothing.

Other gases such as nitrogen are found to be incapable of preventing the deposition of carbon, and the objects of the invention cannot be achieved therewith.

*Example 1*

This example was carried out in an electrically heated fluidized bed of carbon particles for the preparation of hydrogen cyanide from ammonia and gaseous hydrocarbons. The bed was enclosed in a gas-tight steel cylinder 1.68 metres in outside diameter and 2.82 metres high. Refractory brick lined the inside of the steel shell, leaving a cylindrical furnace cavity about 54 cm. in diameter and 160 cm. high. Three graphite electrodes, each 7.6 cm. in diameter, entered the cavity from the top, and projected about 130 cm. into the cavity. Three gas-inlet tubes entered the furnace cavity at the bottom from a manifold, one inlet below each top electrode. Gases to be fed to the furnace were metered to a mixing chamber and distributed from there by the manifold. Three bottom graphite electrodes, 5.1 cm. in diameter, were equally spaced among the gas inlet tubes, and projected into the cavity about 13 cm. A gas outlet tube, 10 cm. inside diameter, was placed 140 cm. above the bottom of the furnace cavity. A number of pyrometer tubes penetrated the furnace walls to permit measurement of temperature inside the furnace. Other tubes permitted the addition of carbon particles to the fluidized bed, and withdrawal of carbon from the bed. The bed of carbon particles at rest was about 30 cm. deep. The carbon particles had an average size between 0.84 and 1.68 mm. The furnace was operated with a reactance coil in series with the top and bottom electrodes, using 220 volt single phase alternating current; it was designed to maintain an optimum reaction temperature in the range 1400°–1500° C.

Ammonia was fed to the reaction furnace at the average rate of 425 litres per minute, corrected to N.T.P., propane at the rate of 138 litres/minute, and hydrogen at the rate of 480 litres/minute. The voltage drop across the furnace was 150 volts while the current averaged 1350 amperes. These conditions were maintained steadily for 14 hours. At the end of this period, the rate of hydrogen addition was reduced to 415 litres/minute. After 4 hours with the reduced hydrogen flow, the voltage drop across the furnace had fallen to 120 volts and the current had risen to 1600 amps. The electrical resistance through the fluidized bed in the furnace had obviously decreased by about one-third.

The amount of carbon which was deposited in the furnace during the previous four hours was then reduced by feeding ammonia for a period of 15 minutes at the rate of 480 litres/minute, while propane was shut off and hydrogen remained at 415 litres/minute; at the end of this period, the voltage drop across the furnace had risen to 165 volts, and operation was resumed with ammonia at 425 litres/minute, propane at 138 litres/minute, and hydrogen at 415 litres/minute. During the next four hours, the voltage again fell gradually to 130 volts and then the operation of the furnace had to be interrupted because the gas outlet was blocked with carbon.

*Example 2*

This example was carried out in the same apparatus described in the preceding example. The fluid bed reactor was operated smoothly with steady feed rates of 330 litres/minute of ammonia, 110 litres/minute propane, and 480 litres/minute of hydrogen, with a steady voltage drop of 200 volts across the furnace and a current of 1250 amps. through the fluidized bed over a period of 24 hours. Temperatures near the bottom of the fluid bed averaged 1370° C. and temperatures near the top about 1480° C. Then the hydrogen supply was cut off. In an attempt to maintain the preceding steady electrical conditions, an equivalent flow of 350 litres/minute of nitrogen was substituted for the interrupted hydrogen flow. During the ensuing 20 minutes the voltage drop across the furnace decreased steadily to 180 volts and the current increased to 1700 amps., indicating that the electrical resistance in the fluidized bed had decreased by about one-third. With the resulting increased current the temperature in the fluidized bed increased about 30° C. near the bottom and about 90° C. near the top. In an attempt to prevent further temperature increase the flows of ammonia and propane were increased to 395 litres/minute and 127 litres/minute respectively, and the nitrogen flow was cut off. The temperatures in the fluidized bed continued to increase quickly, so the ammonia flow rate was further increased to 415 litres/minute for 20 minutes then to 460 litres/minute for 15 minutes, then to 550 litres/minutes for 30 minutes. The voltage drop across the reactor continued to decrease and the reactor had to be shut down.

*Example 3*

Another fluidized bed reactor for the process as described in Example 1, but of somewhat smaller capacity, was operated with substantially steady reactant feed rates of 82 litres/minute of ammonia and 26 litres/minute of propane, with an accompanying substantially uniform feed of 120 litres/minute of hydrogen as diluent. The average voltage drop across the reactor was 200 volts and the average current through the fluidized bed was 300 amperes. The reactor was operated substantially continuously under the foregoing conditions over a period of 23 days. During this interval there were daily scheduled brief periods of about 30 minutes each in which, without interruption of the production of HCN, the propane feed was interrupted, and during these periods the rate of feed of ammonia was temporarily increased. These brief periods, in conjunction with the use of the hydrogen diluent in the process, served adequately and efficiently to maintain the electrical resistance in the reactor at its optimum level and the voltage drop across the reactor at the desired average about 200 volts. At the end of the 23-day period, the reactor was still in excellent general condition and fit for continued operation.

The foregoing example of continuous model operation was observed to be accompanied by a lower level of soot formation, and, with reactant feed ratios at approximately the theoretical 3:1 value, by higher yields of HCN product than were obtained in earlier operations in which no hydrogen diluent was used. Subsequent operations on larger scales have confirmed the observations that minimum soot formation and optimum yields of hydrogen cyanide are obtained in the process as described when adequate dilution of the reactants with hydrogen is used, as previously set forth.

Although propane was used as the gaseous hydrocarbon in the preceding examples, in the process of the present invention, methane, ethane, butanes, pentanes, hexanes and mixtures thereof can also be used with ammonia in the production of hydrogen cyanide in an electrically heated fluidized bed, provided that the approximately 1 to 1 ratio of nitrogen to carbon atoms in the reactants is maintained.

The source of electricity for supplying the heat energy to the fluidized bed can be either direct current or alternating current. In preferred embodiments of this invention, alternating current is used, mainly because it is easier to transform and regulate.

It will also be understood that additional modifications to those already mentioned can be made in the specific embodiments disclosed without departing from the spirit of the invention or the scope of the claims.

What is claimed is:

1. In a process for the production of hydrogen cyanide which comprises maintaining a bed of electrically conductive carbon particles in a fluidized state in a reaction furnace by passing upwardly through the said bed a stream of ingoing gas comprising a mixture of ammonia and a hydrocarbon gas, and passing an electric current between electrodes through the said fluidized bed with sufficient power to maintain the bed at an elevated temperature of about 1300° to 1600° C. sufficient to maintain reaction to form hydrogen cyanide, the improvement which comprises introducing hydrogen into the reaction furnace at a volume ratio to ammonia of at least 0.25 to 1.

2. A process as claimed in claim 1, in which the volume ratio of hydrogen to ammonia is in the range between 1 and 5 to 1.

3. A process as claimed in claim 2, in which the ratio is between 1.0 and 1.5 to 1.

4. A process as claimed in claim 3, in which the hydrocarbon gas is selected from the group consisting of methane, ethane, propane, butanes, pentanes, hexanes, and mixtures thereof.

References Cited in the file of this patent

UNITED STATES PATENTS 2,958,584    Johnson et al. _____ Nov. 1, 1960